United States Patent [19]
Carter et al.

[11] 3,921,047
[45] Nov. 18, 1975

[54] OVERSPEED PROTECTION SYSTEM FOR CENTRIFUGE APPARATUS

[75] Inventors: Alan W. Carter, Newark; Robert C. Franklin, Los Gatos, both of Calif.

[73] Assignee: Beckman Instruments, Inc., Fullerton, Calif.

[22] Filed: Apr. 2, 1973

[21] Appl. No.: 347,355

[52] U.S. Cl. ............... 318/313; 318/462; 318/480
[51] Int. Cl.² ............................................. H02P 3/06
[58] Field of Search ........... 318/313, 480, 462, 463, 318/461, 327; 317/5

[56] References Cited
UNITED STATES PATENTS

| | | | |
|---|---|---|---|
| 3,346,771 | 10/1967 | Sutton | 317/5 |
| 3,365,615 | 1/1968 | Bart | 318/461 X |
| 3,436,637 | 4/1969 | Ehret | 318/449 |
| 3,462,670 | 8/1969 | Waye | 318/464 |
| 3,582,699 | 6/1971 | Badessa et al. | 318/327 |
| 3,691,440 | 9/1972 | Haddock | 317/5 UX |
| 3,731,301 | 5/1973 | Davis | 318/313 X |
| 3,777,233 | 1/1973 | Natens | 318/313 |

Primary Examiner—B. Dobeck
Attorney, Agent, or Firm—R. J. Steinmeyer; F. L. Mehlhoff

[57] ABSTRACT

In an overspeed protection system for a centrifuge apparatus of the type which uses a coded reflective disk having alternate reflective and non-reflective sectors secured to a rotor to determine the maximum safe operating speed thereof, there is disclosed apparatus for detecting, upon start-up of the centrifuge, whether the disk is in place and operating properly. This is ascertained by determining whether the time durations of the signals from the rotor are greater or less than a predetermined minimum value. If they are greater than the minimum value, this is indicative of the fact that the coded disk is in proper position. If they are less than the minimum value, a power shutdown command is generated.

13 Claims, 3 Drawing Figures

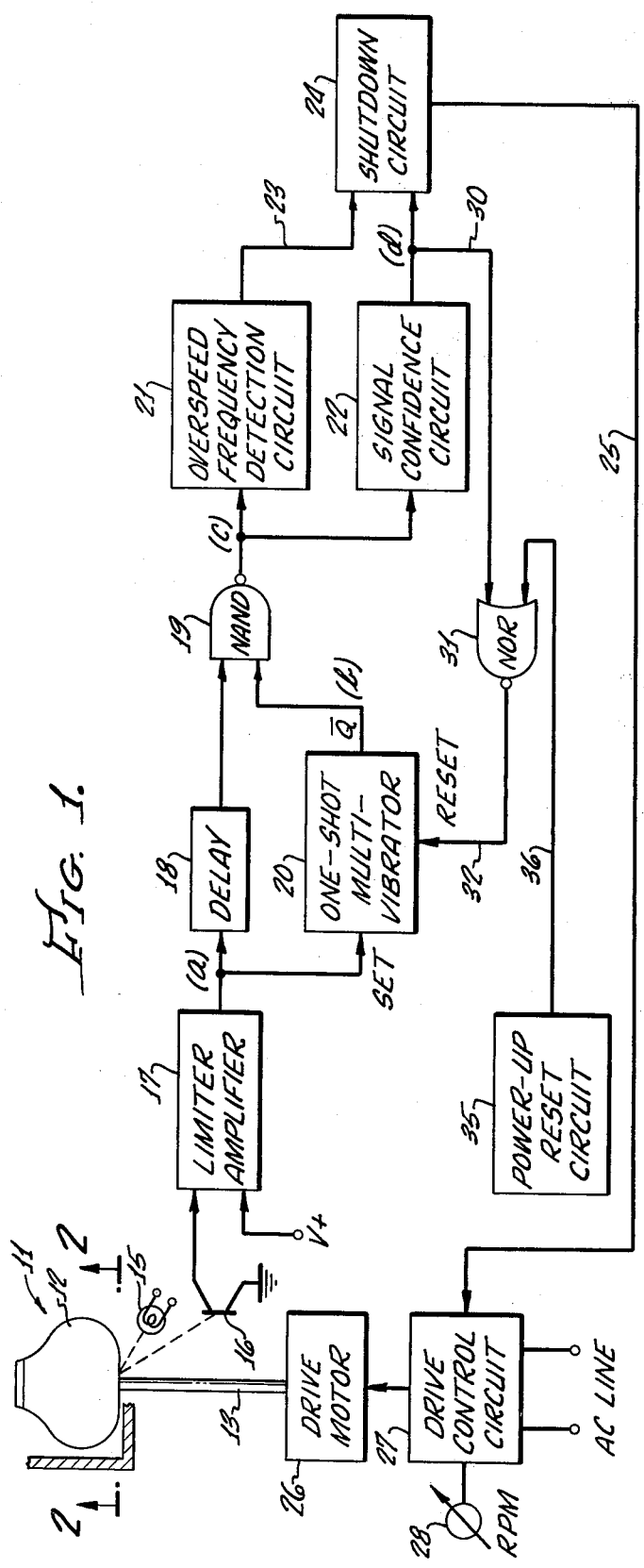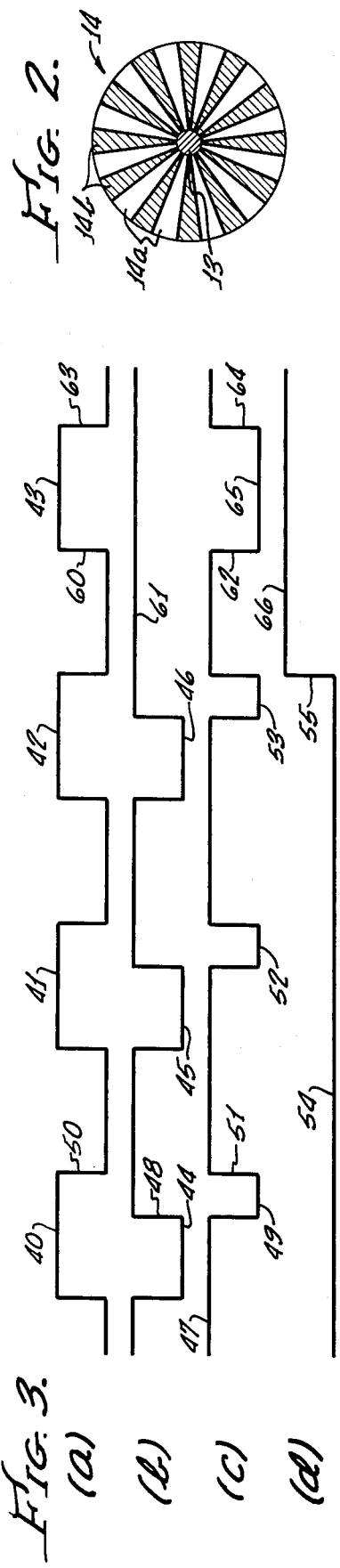

OVERSPEED PROTECTION SYSTEM FOR CENTRIFUGE APPARATUS

BACKGROUND OF THE INVENTION

1. Field of the Invention

The present invention relates to overspeed protection systems for centrifuge apparatus and, more particularly, to means for detecting the presence of a coded disk of the type used in overspeed protection systems.

2. Description of the Prior Art

A centrifuge apparatus generally has the capability of accepting rotors of many different speed ratings and sizes to fit the specific centrifuge application desired. Naturally, each rotor has its own maximum speed rating and must be protected against overspeed and resultant damage.

Overspeed protection has been provided in the past to guard against either operator error or a malfunction of the speed control circuit. Some types of overspeed protection devices have been substantially mechanical and these have sometimes had the inherent defects of mechanical apparatus, such as susceptability to metal fatigue and wear. Elecrical circuits have also been used, but again, the circuits themselves have been subject to malfunction or maladjustment by an operator.

In U.S. Pat. No. 3,436,637 issued Apr. 1, 1969 to Robert J. Ehret for Overspeed Shutdown System for Centrifuge Apparatus and assigned to Beckman Instruments, Inc., the assignee of the present application, there is disclosed and claimed an overspeed protection system which represents a significant improvement over systems used prior thereto. The Ehret overspeed protection system uses a coded reflective disk having alternate reflective and non-reflective sectors secured to the rotor to determine the maximum safe operating speed thereof. The total number of sectors is related to the maximum speed of the rotor. A detector assembly is responsive to rotation of the disk for generating a periodic waveform whose frequency is a function of the rotational speed of the rotor. More specifically, such detector assembly may include a light source positioned to direct light toward the reflective sectors of the disk and light receiving means, such as a phototransistor, responsive to the reflected light. Thus, the output of the phototransistor is the periodic waveform referred to above.

The system of Ehret includes an oscillator for generating a reference signal having a predetermined frequency and a demodulator for mixing the periodic waveform with the reference signal to provide a difference frequency signal whose frequency is the difference between the frequency of the rotational speed signal and the frequency of the reference signal. A filter coupled to the output of the demodulator only passes signals having frequencies below a predetermined frequency, such signals indicating an overspeed condition. When such signals are passed by the filter, or in the absence of a signal at all from the phototransistor, power is disconnected from the drive motor.

The coded disk of the Ehret system is fastened to the bottom of the rotor by means of an adhesive backing. The Ehret system works effectively for preventing overspeed of a centrifuge apparatus as long as the disk remains attached to the bottom of the rotor. However, occasionally a disk falls off of the rotor for a variety of reasons, such as a poor application procedure, a defective adhesive, etc. If this condition is not noted by the operator, the centrifuge apparatus may be started without the proper overspeed protection.

Normally, the Ehret overspeed protection system prevents operation of the rotor because of the requirement that a reflected signal of sufficient amplitude be detected from the bottom of the rotor before centrifuge operation is allowed. Although this provides some protection against "no disk" operation, it has been found that often there are sufficient scratches or residual patches of epoxy or adhesive on the bottom of the rotor to provide the necessary variety in surface reflectivity required for operation of the overspeed signal level detection circuits. However, the difficulty arises from the fact that the reflected signals are no longer representative of the actual speed, thereby preventing proper operation of the overspeed circuitry and presenting the danger of overspeed operation.

SUMMARY OF THE INVENTION

In accordance with the present invention, there is provided an overspeed protection system including means for detecting the presence of a coded disk of the type used for generating a periodic waveform as a function of rotation of a rotor. The operation of the present system is based upon the observation that, at start-up, the time duration of the signal reflected from the bottom of the rotor with no overspeed disk is position is typically less than the time duration of the signal observed from the rotor with an overspeed disk in place. Typically, the time duration of the pulse produced at the output of the phototransistor because of each dark sector of the coded disk is greater than 4 milliseconds during start-up whereas the time duration of the pulses with no overspeed disk in place is typically less than 2 milliseconds. Thus, the present apparatus determines the time durations of the first pulses from the phototransistor and generates a power shutdown command unless certain minimum requirements are met. More particularly, unless the time durations of a predetermined plurality of the pulses within a given time are greater than a predetermined minimum value, a signal is generated to remove power from the rotor drive motor.

OBJECTS

It is therefore an object of the present invention to provide an overspeed protection system for centrifuge apparatus.

It is a futher object of the present invention to provide means for detecting the presence of a coded disk of the type used in overspeed protection systems for centrifuge apparatus.

It is a still further object of the present invention to provide apparatus for determining whether, at start-up, the time duration of the signals reflected from a coded disk in an overspeed protection system is greater or less than predetermined minimum value.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a schematic diagram of the present overspeed protection system, including a partial elevation view of a centrifuge rotor;

FIG. 2 is a partial cross sectional view taken in the direction of the line 2—2 of FIG. 1; and FIG. 3 is a series of waveforms useful in explaining the operation of the system of FIG. 1.

DESCRIPTION OF THE PREFERRED EMBODIMENT

Referring now to the drawings and, more particularly, to FIGS. 1 and 2, thereof, there is shown an overspeed protection system, generally designated 10, for a centrifuge apparatus, generally designated 11. Centrifuge apparatus 11 includes a rotor 12 having a known maximum speed rating mounted for rotation on a shaft 13. As described in the before-mentioned U.S. Pat. No. 3,436,637 to Ehret, rotor 12 has coded reflective disk 14 fixed to the bottom thereof with its center coincident with shaft 13. Disk 14 has alternate reflective and non-reflective sectors 14a and 14b, respectively. The total number of sectors is related to the maximum speed of rotor 12, as discussed in greater detail in the Ehret patent.

Overspeed protection system 10 includes transducer means for providing a periodic waveform whose frequency is a function of the rotational speed of rotor 12. Such transducer means may include coded disk 14, a light source 15 positioned to direct light toward reflective sectors 14a of dick 14, and light receiving means responsive to the reflected light. The light receiving means may include a phototransistor 16 having one terminal grounded and the other terminal coupled to one input of a limiter amplifier 17. Limiter amplifier 17 receives a second input from a source of threshold voltage V+ and functions as a voltage comparator. When the positive-going input signal from phototransistor 16 exceeds the threshold voltage V+, the output of amplifier 17 goes to a positive logic level, which is compatible with the succeeding digital circuitry, to be described hereinafter.

According to the present invention, the output of limiter amplifier 17 is applied via a delay network 18 to the first input of a NAND gate 19. The output of limiter amplifier 17 is also applied to the set input terminal of a retriggerable one-shot multivibrator 20. Multivibrator 20 triggers on the positive slope of an input waveform and produces a negative-going pulse of 3 milliseconds duration at its $\overline{Q}$ output terminal. The $\overline{Q}$ output of multivibrator 20 is applied to the second input of NAND gate 19, the output of which goes negative only when both inputs thereto are simultaneously positive.

Delay network 18 is used to delay the application of pulses to the first input of NAND gate 19, thus allowing for the propagation time of the output of limiter amplifier 17 to the other input of NAND gate 19 via one-shot multivibrator 20. In other words, if multivibrator 20 responded instantaneously to a signal at one of its input terminals, delay network 18 would be uneccessary.

Multivibrator 20 produces a 3 millisecond wide output pulse at its $\overline{Q}$ output beginning with the arrival of each input trigger pulse. Thus, if a second or third trigger pulse were to arrive before the end of any given 3 millisecond interval, the $\overline{Q}$ output would remain low until 3 milliseconds from the last input trigger. Therefore, the effect of multivibrator 20 is to produce a 3 millisecond wide inhibiting pulse at one input to NAND gate 18 for each input pulse from limiter amplifier 17. Only if the input pulses from limiter amplifier 17 are greater than 3 milliseconds duration will a negative-going pulse be seen at the output of NAND gate 19, as will be explained more fully hereinafter. On the other hand, if such input pulses have a duration of less than three milliseconds, the output of NAND gate remains at a positive level.

The output of NAND gate 19 is applied simultaneously to an overspeed frequency detection circuit 21 and to a signal confidence circuit 22. The presence of negative-going pulses at the output of NAND gate 19 is used by circuit 21 to sense an overspeed condition and by circuit 22 to establish a signal confidence. More specifically, assuming proper operation of centrifuge apparatus 11, as will be described more fully hereinafter, the output of NAND gate 19 is a periodic waveform whose frequency is a function of the rotational speed of rotor 12. Overspeed frequency detection circuit 21 may include an oscillator for generating a reference signal having a predetermined frequency and a demodulator for mixing the periodic waveform with the reference signal to provide a difference frequency signal, as described in the Ehret patent. Circuit 21 may also include a filter coupled to the output of the demodulator to only pass signals having frequencies below a predetermined frequency, such signals indicating an overspeed condition. In the presence of an overspeed condition, a signal is applied via a line 23 to a shutdown circuit 24 which may function in the same manner as the SCR circuit of the Ehret patent to generate a signal to shutdown the drive circuit of centrifuge apparatus 11.

More specifically, the driving system of centrifuge apparatus 11 may include a drive motor 26 coupled to shaft 13 which in turn is controlled by a drive control circuit 27 connected to an external AC line. The operator determines the speed of rotor 12 by adjusting a speed control 28 and, in practice, adjusts speed control 28 for the proper revolutions per minute of the particular rotor 12 being used in centrifuge apparatus 11. However, in the presence of an overspeed condition, shutdown circuit 24 applies a signal via a line 25 to drive control circuit 27 to remove power from drive motor 26. For a further discussion of overspeed frequency detection circuit 21 and shutdown circuit 24, reference should be had to U.S. Pat. No. 3,436,637.

According to the present invention, signal confidence circuit 22 generates a power shutdown command and applies such command via a line 30 to shutdown circuit 24 unless the time durations of a sufficient number of pulses from NAND gate 19 are greater than a predetermined minimum value. Signal confidence circuit 22 may include an AC coupled diode pump circuit which will accumulate a charge on a capacitor over a period of time. Thus, the negative pulses from NAND gate 19 are used to accumulate such a charge. If a sufficient number of pulses occur within a predetermined period of time, the level of charge on the capacitor reaches a threshold level. At this time, a gating circuit, such as a FET transistor, is activated, causing the output of circuit 22 on line 30 to go from a negative to a positive value. This change causes shutdown circuit 24 to remove its signal from line 25 to permit continued operation of the drive motor 26 via drive control circuit 27.

As centrifuge rotor 12 accelerates, the input pulses from coded disk 14 become shorter and shorter, eventually having a duration less than the duration of the inhibiting pulse output of multivibrator 20. It thus becomes necessary, once signal confidence is established, to remove the inhibiting pulse input to NAND gate 19 from multivibrator 20. This is accomplished by applying the output of signal confidence circuit 22 on line 30 to one input of a NOR gate 31, the output of which goes negative when either input thereto goes positive. The output of NOR gate 31 is applied via a line 32 to the reset input terminal of multivibrator 20. By applying the positive signal confidence level from circuit 22 to gate 31, multivibrator 20 is held in the reset condition, thereby removing the inhibiting pulse input from NAND gate 19.

It is also necessary to temporarily reset multivibrator 20 in case the primary machine power should momentarily fail while rotor 12 is spinning at a relatively high speed. Thus, centrifuge apparatus 11 typically includes a power-up reset circuit 35 which generates a positive reset signal on a line 36 for a predetermined period of time when power has been restored after a power failure. This reset signal on line 36 is applied to the other input of NOR gate 31 so as to momentarily reset multivibrator 20 to remove the inhibiting pulse input from NAND gate 19. This permits the pulses from aplifier 17 to reset signal confidence circuit 22 via NAND gate 19.

OPERATION

The operation of the circuit of FIG. 1 may best be understood with reference to FIG. 3 which shows a series of waveforms at selected locations within overspeed protection system 10. Waveform (a) indicates a typical output of limiter amplifier 17, waveform (b) indicates a typical output of multivibrator 20, waveform (c) indicates a typical output of NAND gate 19, and waveform (d) indicates a typical output of signal confidence circuit 22.

As discussed previously, the operation of overspeed protection system 10 is based upon the observation that, at start-up, the time duration of the signal reflected from the bottom of rotor 12 with no overspeed disk 14 in position is typically less than the time duration of the signal reflected from each reflective sector 14a when disk 14 is in place. Typically, the signal reflected from the bottom of rotor 12 with no overspeed disk in position results in pulses at the output of limiter amplifier 17 which are less than 2 mulliseconds in duration whereas the signal reflected by each sector 14a results in a pulse at the output of limiter amplifier 17 which is greater than 4 milliseconds in duration. Thus, the circuitry connected to the output of limiter amplifier 17 determines the time duration of the first pulses from phototransistor 16 and generates a power shutdown command signal on line 30 unless certain minimum requirements are met.

Waveform (a) of FIG. 3 shows a series of positive pulses 40, 41, 42, and 43 at the output of limiter amplifier 17, each of which has a time duration of 4 milliseconds or greater. Thus, it will be assumed that coded disk 14 is in position during start-up centrifuge apparatus 11. Pulses 40–43 are applied directly to NAND gate 19 via delay 18 and to the set input terminal of multivibrator 20. Multivibrator 20 produces a plurality of negative-going pulses at the $\overline{Q}$ output thereof, each of said pulses having a 3 millisecond duration. 3 milliseconds has been chosen as the reference cutoff duration in selecting which pulses from amplifier 17 do or do not come from disk 14. Thus, the positive-going leading edge of pulse 40 sets multivibrator 20, which generates a negative pulse 44 of 3 milliseconds duration at its $\overline{Q}$ output. At the end of such 3 millisecond interval, multivibrator 20 is automatically reset and the $\overline{Q}$ output returns to a positive value. Similarly, pulses 41 and 42 from limiter amplifier 17 causes pulses 45 and 46, respectively, to be generated at the output of multivibrator 20. On the other hand, pulse 43 generates no corresponding negative pulse signal at the $\overline{Q}$ output of multivibrator 20, for reasons which will appear more fully hereinafter.

It can now be seen that a three millisecond wide inhibiting pulse is produced at one input of NAND gate 19 for each input pulse from limiter amplifier 17. Thus, during the time that the pulse output of amplifier 17 is positive and the pulse output of multivibrator 20 is negative, the output of NAND gate 19 remains positive. This is shown in waveform (c) which remains positive, at 47, during positive pulse 40 and negative pulse 44. However, when multivibrator 20 is reset and the $\overline{Q}$ output goes positive, at 48, both inputs to NAND gate 19 are now positive, since the time duration of pulse 40 is in excess of three milliseconds. At this time, the output of NAND gate 19 goes negative, at 49, until the termination of pulse 40, at 50. At this time, the output of NAND gate 19 returns to a positive value, at 51. However, the result is a negative-going pulse at the output of NAND gate 19 for each pulse from limiter amplifier 17, but only if such pulses have a time duration in excess of 3 milliseconds. Thus, pulses 41 and 42 from limiter amplifier 17 cause pulses 52 and 53, respectively, to be generated at the output of NAND gate 19.

At start-up, the output of signal confidence circuit 22 is low, as shown at 54 in waveform (d). Such a low signal is interpreted by shutdown circuit 24 as requiring a power shutdown command to be applied over line 25 to drive control circuit 27. However, since separate control and drive circuitry is used during start-up, such power shutdown command does not prevent the operation of centrifuge apparatus 11 and start-up continues. However, if the power shutdown command remains on line 25 after start-up and when drive control circuit 27 takes over, power will immediately be removed from drive motor 26, shutting down centrifuge apparatus 11.

The presence of pulses at the output of NAND gate 19 is used to establish a signal confidence via circuit 22. Thus, pulses 49, 52, and 53 at the output of NAND gate 19 are applied to signal confidence circuit 22. Such pulses are AC coupled by a diode pump circuit to a capacitor which is charged by such pulses. When the charge reaches a predetermined threshold level, signal confidence circuit 22 is triggered to cause the output on line 30 to go to a positive level. Assuming, for example, that three pulses from NAND gate 19 within a one second interval are required to trigger circuit 22, it is seen that immediately upon termination of pulse 53, the output of circuit 22 on line 30 goes positive, at 55. When circuit 22 goes positive, at 55, shutdown circuit 24 removes the power shutdown command from line 25 and drive control circuit 27 is permitted to commence operation upon termination of start-up.

As rotor 12 of centrifuge apparatus 11 accelerates, the pulses at the output of limiter amplifier 17 become shorter and shorter, eventually becoming shorter than 3 milliseconds in duration. If multivibrator 20 continued to operate, the output of NAND gate 19 would be inhibited and the capacitor within signal confidence circuit 22 would discharge. Since such discharge would return the output on line 30 from circuit 22 to a negative level and restore the power shutdown command at the output of circuit 24, it beeomes necessary to remove the inhibiting pulse input to NAND gate 19 once a signal confidence is established. This is accomplished by applying the output of circuit 22 to the reset input terminal of multivibrator 20 via line 30, NOR gate 31, and line 32. This holds multivibrator 20 in a reset condition so that the output of NAND gate 19 becomes the exact mirror image of the output of limiter amplifier 17.

More specifically, and with reference to FIG. 3, waveform (d) shows the signal on line 30 which is applied to NOR gate 31, the output of which is applied to reset multivibrator 20. Thus, when the output of limiter amplifier 17 goes positive, at 60, the $\overline{Q}$ output of multivibrator 20 remains positive, at 61. Therefore, the output of NAND gate goes negative, at 62, and remains at a negative level until the output of limiter amplifier 17 goes negative, at 63, whereupon the output of NAND gate 19 goes positive, at 64. Thus, pulse 43 at the output of amplifier 17 generates a corresponding pulse 65 at the output of NAND gate 19, such pulses maintaining the charge on the capacitor in circuit 22 and retaining the positive confidence level at the output of circuit 22, at 66.

As mentioned previously, it is also necessary to temporarily reset multivibrator 20 in case the primary machine power should momentarily fail while rotor 12 is spinning at a relatively high speed. Thus, the power-up reset circuit 35 normally within ultracentrifuge apparatus 11 has the output thereof applied via line 36 to the other input of NOR gate 31. That is, circuit 35 momentarily resets multivibrator 20 upon reapplication of machine power. If multivibrator were not to be reset, the pulses at the output of amplifier 17 would be too shrot, because of the high speed, to pass through NAND gate 19. However, by inhibiting multivibrator 20, the pusles from amplifier 17 are applied via NAND gate 19 to circuit 22 to recharge the capacitor which was discharged by power failure.

It can therefore be seen that in accordance with the present invention, there is provided an overspeed protection system for centrifuge apparatus including means for detecting the presence of a coded disk of the type used for generating a periodic waveform as a function of rotation of a rotor. The present apparatus determines the time durations of the first pusles from phototransistor 16 and generates a power shutdown command unless certain minimum requirements are met. More particularly, unless the time durations of a predetermined plurality of the pulses within a given time interval are greater than a predetermined minimum value, a signal is generated on line 25 to remove power from drive motor 26.

While the invention has been described with respect to the preferred physical embodiment cnstructed in accordance therewith, it will be apparent to those skilled in the art that various modifications and improvements may be made without departing from the scope and spirit of the invention. More particularly, although the present transducer means includes a light source, a phototransistor, and a coded disk of the type which includes alternate reflective and non-reflective sectors, it will be obvious to those skilled in the art that other types of transducers may be utilized as long as they include a coded disk having a plurality of spaced sectors, the total number of which is related to the maximum speed of the rotor. Furthermore, other circuits than that specifically described will be obvious to those skilled in the art for generating a power shutdown command unless the time durations of a predetermined plurality of pulses within a given time interval are greater than a predetermined minimum value. Accordingly, it is to be understood that the invention is not to be limited by the specific illustrative embodiment, but only by the scope of the appended claims.

We claim:

1. In an overspeed protection system for a centrifuge apparatus including a rotor driven by a drive motor; transducer means including a coded disk having a plurality of spaced sectors secured to said rotor and a detector assembly responsive to rotation of said disk for generating a signal for each waveform whose frequency is a function of the rotational speed of said rotor; and means coupled to the output of said transducer means and responsive the frequency of said periodic waveform for sensing an overspeed condition of said rotor, the improvement comprising:

means coupled to the output of said transducer means during start up and inoperable after a given time interval theratfer, said means responsive to the time duration of said signals from said detector assembly for generating a power shutdown command for said drive motor unless the time duration of at least one of said signals during said interval is greater than a predetermined minimum value.

2. In an overspeed protection system according to claim 1, the improvement wherein said power shutdown command is generated unless the time durations of a plurality of said signals within the given time interval are greater than said predetermined minimum value.

3. In an overspeed protection system according to claim 2, the improvement wherein the number of said plurality of said signals is predetermined.

4. In an overspeed protection system according to claim 2, the improvement wherein said generating means includes means responsive to the occurrence of said plurality of said signals having time durations greater than said predetermined minimum value for preventing further generation of said power shutdown command.

5. In an overspeed protection system according to claim 2, the improvement wherein said detector assembly generates a pulse for each received signal having an amplitude greater than a set threshold level.

6. In an overspeed protection system according to claim 2, the improvement wherein said predetermined minimum value is approximately 3 milliseconds.

7. In an overspeed protection system according to claim 1, the improvement wherein said power shutdown command generating means comprises:

means coupled to the output of said transducer means and responsive to each of said signals therefrom for generating an inhibiting pulse having a time duration equal to said predetermined minimum value;

gate means coupled to the output of said transducer means and to the output of said inhibiting pulse generating means for generating a gate pulse whenever the time duration of one of said signals from said transducer means exceeds the time duration of one of said inhibiting pulses; and confidence circuit means coupled to the output of said gate means for generating said power shutdown command unless a plurality of said pulses are received during a predetermined time interval.

8. In an overspeed protection system according to claim 7, the improvement wherein said confidence circuit means is responsive to the occurrence of said plurality of gating pulses during said predetermined time interval for preventing further generation of a power shutdown command.

9. In an overspeed protection system according to claim 8, the improvement wherein said power shutdown command generating means further comprises:
means for applying the output of said confidence circuit means to said inhibiting pulse generating means for preventing further generation of inhibiting pulses, thereby preventing further generation of said power shutdown command.

10. In an overspeed protection system according to claim 1, wherein said coded disk has alternate reflective and non-reflective sectors, the total number of said sectors being related to the maximum speed of said rotor, the improvement wherein said transducer means includes:
a light source positioned to direct light toward said reflective sectors of said disk;
a phototransistor positioned to be responsive to light reflected from said disk; and
a limiter amplifier responsive to said phototransistor and to a source of threshold voltage for generating a pulse whenever the signal from said phototransistor exceeds said threshold voltage.

11. In an overspeed protection system according to claim 10, the improvement wherein said power shutdown command generating means comprises:
one-shot multivibrator means coupled to the output of said limiter amplifier means and responsive to each of said pulses therefrom for generating an inhibiting pulse having a time duration equal to said predetermined minimum value;
gate means coupled to the output of said limiter amplifier means and to the output of said multivibrator means for generating a gating pulse whenever the time duration of one of said pulses from said limiter amplifier exceeds the time duration of one of said inhibiting pulses; and
confidence circuit means coupled to the output of said gate means for generating said power shutdown command unless a plurality of said gating pulses are received during a predetermined time interval.

12. In an overspeed protection system according to claim 11, the improvement wherein said confidence circuit means comprises:
charging circuit means responsive to said gating pulses for accumulating a charge; and
gating circuit means responsive to said charging circuit means for generating said power shutdown command until the level of said charge reaches a predetermined threshold level.

13. In an overspeed protection system according to claim 12, the improvement wherein said power shutdown command generating means further comprises:
means for applying the output of said gating circuit means as a reset signal to said multivibrator means for preventing further generation of inhibiting pulses when the level of said charge reaches said predetermined threshold level.

* * * * *